W. ROBERTSON.
FLEXIBLE EXPANSION COUPLING FOR ROTARY SHAFTS.
APPLICATION FILED MAR. 5, 1921.
1,407,299.
Patented Feb. 21, 1922.
2 SHEETS—SHEET 2.
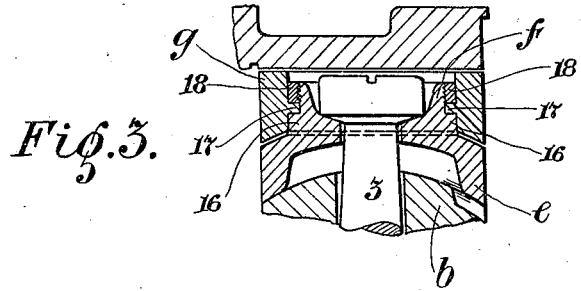
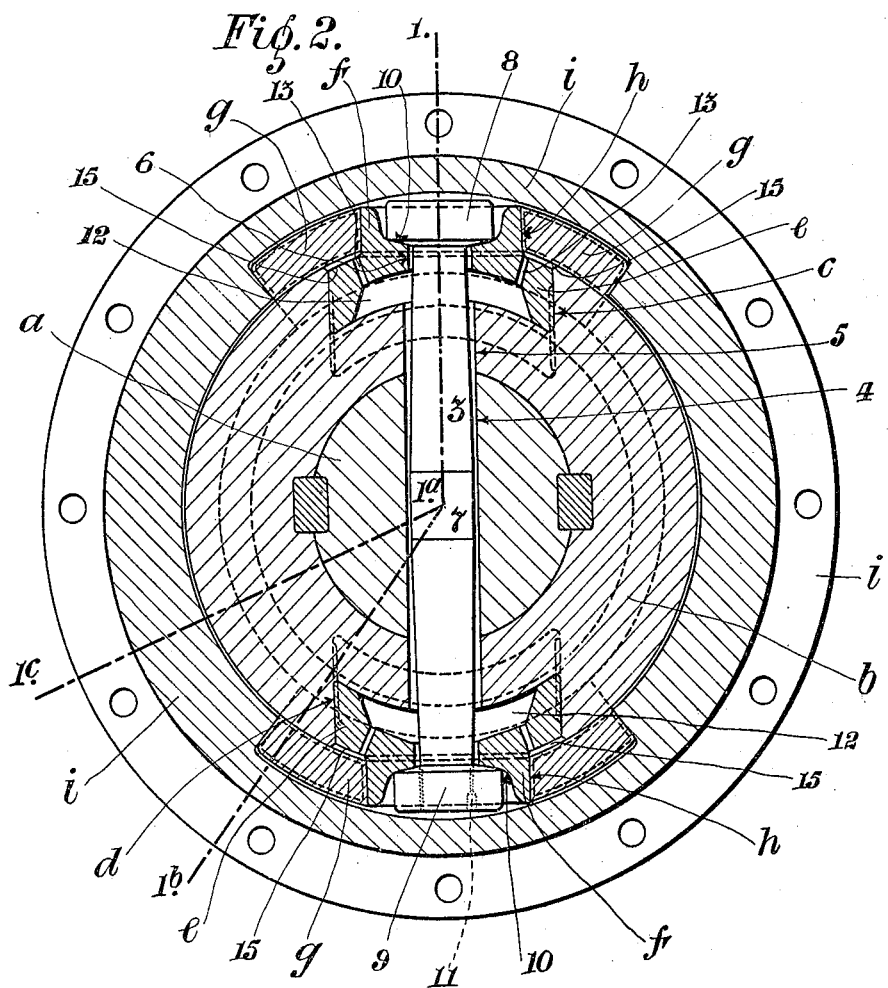

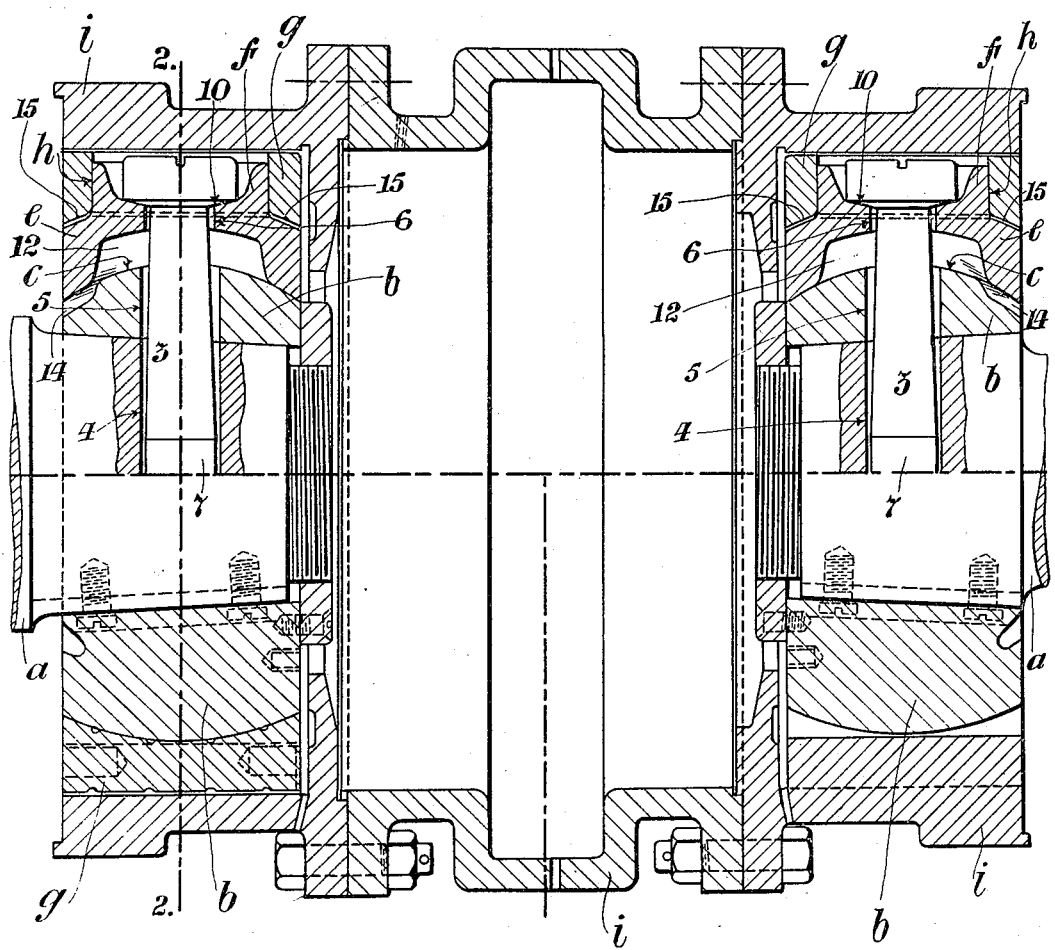

UNITED STATES PATENT OFFICE.

WILLIAM ROBERTSON, OF GOVAN, GLASGOW, SCOTLAND, ASSIGNOR OF ONE-HALF TO THE FAIRFIELD SHIPBUILDING & ENGINEERING COMPANY LIMITED, OF GOVAN, GLASGOW, SCOTLAND.

FLEXIBLE EXPANSION COUPLING FOR ROTARY SHAFTS.

1,407,299.  Specification of Letters Patent.  Patented Feb. 21, 1922.

Application filed March 5, 1921. Serial No. 449,658.

*To all whom it may concern:*

Be it known that WILLIAM ROBERTSON, of 233 Langlands Road, Govan, Glasgow, Scotland, a subject of the King of Great Britain, has invented a certain new and useful Improved Flexible Expansion Coupling for Rotary Shafts, of which the following is a specification.

This invention relates to what are known as flexible expansion couplings for uniting shafts which are out of axial alignment or which are liable to become disaligned under working conditions, and is an improvement in or modification of the invention claimed in the specification of the prior U. S. Letters Patent No. 1358467 dated 9th November, 1920.

In the specification of the prior Letters Patent aforesaid is described and claimed, a coupling comprising two joints, one for the driving and one for the driven shaft, both located within a sleeve coupling and each comprising co-acting spherically curved boss, socket keys and fulcrum blocks (or equivalent) within which pins on the socket keys can pivot, the fulcrum blocks (or keys) being fitted in the sleeve coupling in such manner as to allow them freedom of longitudinal movement therein.

The present invention consists in embodying, in such couplings, means for preventing the outward pressure of the socket keys due to centrifugal force being transmitted to the fulcrum blocks and the external sleeve coupling. Such friction between the socket keys and the fulcrum blocks as may be due to centrifugal force is also thereby eliminated.

Preferably each pair of diametrically opposite and identically similar socket keys is coupled by a tie bolt or equivalent so that any tendency of the one to move outwards, under centrifugal action, is counteracted by the same tendency of the other and as the centrifugal force acting on the keys is equal and in opposite directions the keys are consequently balanced. A clearance space is left between the shoulders of the socket keys and the fulcrum blocks so that any slight outward movement of the keys due to elongation, under tension, of the tie bolt shall not be communicated to the fulcrum blocks and cause a bearing load thereon.

In some cases the pairs of fulcrum blocks may also be coupled together.

The accompanying drawing illustrates, by way of example, a coupling constructed in accordance with the aforesaid prior patent and embodying a form of the present invention.

Referring now to the drawing, whereon Fig. 1 is a composite longitudinal section, the upper half on the line 1—1ᵃ and the lower half, to the left of the vertical centre line, on the line 1ᵃ—1ᵇ and, to the right of the vertical centre line, on the line 1ᵃ—1ᶜ, all of Fig. 2 which is a transverse section on the line 2—2, Fig. 1, and Fig. 3 is a sectional detail of a modification; $a$, $a$ are the coupled shafts either of which may be the driver or the driven; $b$, $b$, are the sphero-segmental bosses; $c$, $c$, and $d$, $d$, are the arcuate keyways in the latter; $e$, $e$, are the socket keys and $f$, $f$, the radially projecting pins thereon; $g$, $g$, are the fulcrum blocks having holes $h$, $h$, therein for the reception of the pins $f$, $f$; and $i$ is the cylindrical sleeve, all substantially as described in the specification of the prior Letters Patent aforesaid.

According to the form of the present invention illustrated the pairs of diametrically opposite socket keys $e$ are coupled by tie bolts 3 which pass through aligned holes 4, 5 and 6 in the shafts $a$, bosses $b$ and socket keys $e$. In order to admit of the necessary angular movement of the shafts $a$ and bosses $b$ the bolts 3 are made an easy fit in the aligned holes and each bolt tapers somewhat from a maximum at a central cylindrical portion 7 to a minimum at the head 8 and nut 9 which are adapted to fit into housings or sockets 10 in the socket keys *e*. The head 9 is, after adjustment, secured in place by a grub screw 11. Clearance spaces 15 are left between the shoulder of the socket keys *e* and the fulcrum blocks *g* these spaces being sufficient to allow for any slight elongation of the tie bolts under the load (due to centrifugal force) put upon them by the socket keys.

To admit of adequate lubrication of working parts oilways or channels are, or may be, formed therein and recesses 12 are formed in the inner faces of the socket keys *e* which communicate directly or by suitable ducts, such as 13, with the bearing surfaces of the bosses *b*, socket keys *e*, fulcrum blocks *g* and sleeve *i* and with oil inlets 14 in the bosses *b*. Oil is fed outwards from the recesses 12 to all bearing surfaces by centrifugal force. If so desired the pairs of fulcrum blocks may also be coupled together by the tie bolts, this being preferably effected by keying the socket keys and fulcrum blocks together as, for instance, by providing shoulders 16 and 17 on the pins *f* and fulcrum blocks *g*, respectively, and securing same together, when in operative position, by a ring 18 screwed or otherwise secured to the pin *f*, as illustrated by Fig. 3.

Having now fully described my invention what I claim and desire to secure by Letters Patent is:—

1. A flexible expansion coupling for rotary shafts comprising a sleeve and two joints, one for the driving and one for the driven shaft, located in said sleeve and operatively connected therewith, each joint comprising co-acting spherically curved boss, socket keys, fulcrum blocks and means for preventing outward pressure of the socket keys due to centrifugal force being transmitted to the fulcrum blocks and sleeve.

2. A flexible expansion coupling for rotary shafts comprising a sleeve and two joints, one for the driving and one for the driven shaft, located in said sleeve and operatively connected therewith, each joint comprising co-acting spherically curved boss, socket keys, fulcrum blocks and means coupling said socket keys together.

3. A flexible expansion coupling for rotary shafts comprising a sleeve and two joints, one for the driving and one for the driven shaft, located in said sleeve and operatively connected therewith, each joint comprising co-acting spherically curved boss, socket keys, fulcrum blocks and means extending through the boss and coupling the socket keys together.

4. A flexible expansion coupling for rotary shafts comprising a sleeve and two joints, one for the driving and one for the driven shaft, located in said sleeve and operatively connected therewith, each joint comprising co-acting spherically curved boss, a pair of diametrically opposite socket keys, fulcrum blocks and a tie bolt connecting said socket keys.

5. A flexible expansion coupling for rotary shafts comprising a sleeve and two joints, one for the driving and one for the driven shaft, located therein, each joint comprising a boss having keyways therein, socket keys engaging said keyways, a pin on each socket key, fulcrum blocks engaging said pins and the aforesaid sleeve and ties connecting said socket keys to prevent the outward pressure of same, due to centrifugal force, being transmitted to the fulcrum blocks and sleeve.

6. A flexible expansion coupling for rotary shafts comprising a sleeve and two joints, one for the driving and one for the driven shaft located in said sleeve and operatively connected therewith, each joint comprising a boss having arcuate keyways therein, socket keys engaging said keyways, a pin on each socket key, fulcrum blocks engaging said pins and permitting angular movement thereof and tie bolts connecting said socket keys.

7. A flexible expansion coupling for rotary shafts comprising a sleeve and two joints, one for the driving and one for the driven shaft, located in said sleeve and operatively connected therewith, each joint comprising a boss, oppositely disposed socket keys and fulcrum blocks and tie means uniting the oppositely disposed socket keys.

8. A flexible expansion coupling for rotary shafts comprising a sleeve and two joints, one for the driving and one for the driven shaft, located in said sleeve and each comprising a sphero-segmental boss having guides therein, socket keys engaging said guides and slidable therein, pins on said socket keys, fulcrum blocks engaging said sleeve and pins and permitting rotational movement of the latter and a tie uniting said socket keys.

9. A flexible expansion coupling for rotary shafts comprising a sleeve and two joints, one for the driving and one for the driven shaft, located therein and operatively connected therewith, each joint comprising co-acting spherically curved boss, socket keys, fulcrum blocks, means preventing relative radial movement of socket keys and fulcrum blocks and means preventing outward pressure of the socket keys and fulcrum blocks, due to centrifugal force, being transmitted to the sleeve.

10. A flexible expansion coupling for rotary shafts comprising a sleeve and two joints, one for the driving and one for the driven shaft, located therein and operatively connected therewith, each joint comprising co-acting boss, socket keys and fulcrum blocks, the two former having aligned holes therein, and a tie bolt in said holes connecting said socket keys.

11. A flexible expansion coupling for rotary shafts comprising a sleeve having guideways therein, a sphero-segmental boss in said sleeve having arcuate guideways therein, socket keys slidable in said arcuate guideways, pins on said socket keys, fulcrum blocks engaging said pins and slidable in the guideways in said sleeve and a tie bolt passing through said boss and socket keys and uniting the latter.

In testimony whereof I affix my signature in presence of two witnesses.

WILLIAM ROBERTSON.

Witnesses:
JOHN STOTT,
JAMES DUNLOP.